(12) United States Patent​ (10) Patent No.: US 7,545,074 B2
Maekawa et al.​ (45) Date of Patent: Jun. 9, 2009

(54) ROTOR FOR AUTOMOTIVE ALTERNATOR HAVING IMPROVED MAGNET HOLDER

(75) Inventors: Takeo Maekawa, Okazaki (JP); Shin Kusase, Oobu (JP)

(73) Assignee: Denso Corporation, Kariya (JP)

( * ) Notice: Subject to any disclaimer, the term of this patent is extended or adjusted under 35 U.S.C. 154(b) by 72 days.

(21) Appl. No.: 11/798,135

(22) Filed: May 10, 2007

(65) Prior Publication Data
US 2007/0262672 A1 Nov. 15, 2007

(30) Foreign Application Priority Data
May 15, 2006 (JP) ............................. 2006-134969

(51) Int. Cl.
*H02K 1/22* (2006.01)
(52) U.S. Cl. ..................................... 310/263
(58) Field of Classification Search ............ 310/156.66, 310/156.72–156.73, 263
See application file for complete search history.

(56) References Cited

U.S. PATENT DOCUMENTS

| 5,483,116 | A |  | 1/1996 | Kusase et al. |
| 5,793,144 | A |  | 8/1998 | Kusase et al. |
| 5,907,209 | A |  | 5/1999 | Ishida |
| 5,925,964 | A | * | 7/1999 | Kusase et al. ............... 310/263 |
| 6,104,118 | A | * | 8/2000 | Kanazawa et al. .......... 310/263 |

FOREIGN PATENT DOCUMENTS

| JP | A 10-66286 | 3/1998 |
| JP | B2 3446313 | 7/2003 |

* cited by examiner

*Primary Examiner*—Tran N Nguyen
(74) *Attorney, Agent, or Firm*—Oliff & Berridge, PLC (57) ABSTRACT

According to the invention, there is provided a rotor for a rotating electrical machine which includes a rotary shaft, a pair of first and second pole cores fixed on the rotary shaft, a plurality of permanent magnets, and a magnet holder holding the permanent magnets. The magnet holder is made of a non-magnetic metal and has a plurality of holding portions and a plurality of connecting portions. Each of the holding portions is interposed between circumferentially adjacent two of claws of the first and second pole cores, so as to hold a corresponding one of the permanent magnets between the adjacent two claws. Each of the connecting portions circumferentially extends, through the radially inner side of a distal end portion of one of the claws of the first and second pole cores, to connect end portions of adjacent two of the holding portions which circumferentially bracket the distal end portion.

29 Claims, 10 Drawing Sheets

ROTOR FOR AUTOMOTIVE ALTERNATOR HAVING IMPROVED MAGNET HOLDER

CROSS-REFERENCE TO RELATED APPLICATION

This application is based on and claims priority from Japanese Patent Application No. 2006-134969, filed on May 15, 2006, the content of which is hereby incorporated by reference into this application.

BACKGROUND OF THE INVENTION

1. Technical Field of the Invention

The present invention relates generally to rotating electrical machines, such as electric generators and motors. More particularly, the invention relates to a rotor for an automotive alternator which includes an improved magnet holder for holding a plurality of permanents magnets between interleaved claws of lundell-type pole cores.

2. Description of the Related Art

There is known a method of improving the efficiency of an automotive alternator, which includes a rotor having a pair of lundell-type pole cores, by disposing a plurality of permanent magnets between the pole cores.

More specifically, each of the lundell-type pole cores is secured on a rotary shaft of the rotor and includes a plurality of claws extending in the axial direction of the rotary shaft. The claws of one of the pole cores are interleaved with those of the other pole core. Further, according to the method, each of the permanent magnets is interposed between adjacent two of the claws of the pole cores in the circumferential direction of the rotary shaft, so as to diminish the magnetic flux leakage between the adjacent two of the claws and to direct the magnetic flux developed by the permanent magnet toward a field coil of the alternator, thereby improving the efficiency of the alternator.

Moreover, U.S. Pat. No. 5,925,964 discloses the use of a resin-molded magnet holder for securely holding the permanent magnets between the claws of the pole cores.

According to the disclosure, the magnet holder is shaped in a meandering ring that extends in the circumferential direction in a zigzag manner. The magnet holder includes a plurality of board parts (i.e., holding portions), each of which axially extends to hold thereon one of the permanent magnets, and connecting parts (i.e., connecting portions) each of which circumferentially extends to connect middle portions of adjacent two of the board parts.

However, for formation of the magnet holder by resin molding, a complicated mold is required due to the complexity of shape of the magnet holder, thus increasing the manufacturing cost.

Further, to secure the strength of the magnet holder and to prevent formation of underfill during the resin moldering process, it is necessary to make the thickness of the magnet holder being above a certain level, for example 1 mm.

However, with such a thickness of the magnet holder, since the connecting parts connect the middle portions of the board pats and are thus radially adjacent to the field coil, the space available for winding the field coil around the pole cores is accordingly reduced. Consequently, the strength of the magnetic field is lowered, thus reducing the power output of the alternator.

Furthermore, in the resin molding process, a mold release agent is generally applied on the mold so as to make it easy to release a work from the mold.

However, the mold release agent usually adheres to the work and thus remains on the surface of the resultant magnet holder. Consequently, in fitting the magnet holder between the claws of the pole cores by adhesion, it is difficult to secure sufficient adhesion strength.

In addition, since the magnet holder is made of a resin material, it may be damaged during assembly of the rotor due to an excessive force applied thereon.

On the other hand, Japanese Patent First Publication No. H10-66286 discloses the use of a protective cover for each of the permanent magnets.

According to the disclosure, the protective cover is made of a resin or metal material. The permanent magnet covered with the protective cover is press-fitted between circumferentially adjacent two of the claws of the pole cores.

However, since each of the permanent magnets is covered with an individual protective cover, the number of the protective covers is the same as that of the permanent magnets and it is required to fit the permanent magnets between the claws of the pole cores in a one-by-one manner. Consequently, both the parts count and the steps of assembly of the rotor are increased, thus increasing the manufacturing cost.

Further, to securely fix the permanent magnets, the circumferential side faces of the claws of the pole cores are toothed to bite the respective protective covers. Consequently, due to the additional process of toothing, the manufacturing cost is further increased.

SUMMARY OF THE INVENTION

The present invention has been made in view of the above-mentioned problems.

It is, therefore, a primary object of the present invention to provide a rotor for a rotating electrical machine which includes an improved magnet holder that can securely hold and protect the permanent magnets without reducing the space available for the field coil and complicating the assembly of the rotor.

It is a further object of the present invention to provide an automotive alternator which includes such a rotor with an improved magnet holder.

According to a first aspect of the present invention, there is provided a rotor for a rotating electrical machine which includes a rotary shaft, a pair of first and second pole cores, a plurality of permanent magnets, and a magnet holder.

The first and second pole cores are fixed on the rotary shaft. Each of the first and second pole cores includes a plurality of claws each of which extends in an axial direction of the rotary shaft and has a distal end portion. The claws of the first pole core are interleaved with the claws of the second pole core.

Each of the permanent magnets is interposed between adjacent two of the claws of the first and second pole cores in a circumferential direction of the rotary shaft.

The magnet holder holds the permanent magnets. The magnet holder is made of a non-magnetic metal and has a plurality of holding portions and a plurality of connecting portions. Each of the holding portions is interposed between adjacent two of the claws of the first and second pole cores in the circumferential direction of the rotary shaft, so as to hold a corresponding one of the permanent magnets between the adjacent two of the claws. Each of the connecting portions extends in the circumferential direction of the rotary shaft, through the radially inner side of the distal end portion of one of the claws of the first and second pole cores, to connect end portions of adjacent two of the holding portions which bracket the distal end portion in the circumferential direction.

Using the non-magnetic metal material, the magnet holder can be easily formed through pressing, bending, and joining processes.

Consequently, compared to the conventional magnet holder disclosed in U.S. Pat. No. 5,925,964, the manufacturing cost can be considerably reduced.

Further, using the non-magnet metal material, it is possible to make the magnet holder very thin while securing sufficient strength of the magnet holder.

Furthermore, since each of the connecting portions of the magnet holder extends only through the radially inner side of the distal end portion of the corresponding claw to connect the end portions of the adjacent two holding portions, the space available for winding a field coil around the first and second pole cores is considerably increased in comparison with the conventional magnet holder.

Consequently, it is possible to set both the wire turns and wire diameter of the field coil to desirable values, thereby enhancing the efficiency of the rotating electrical machine.

In a further implementation of the invention, the magnet holder is made of a non-magnetic steel sheet.

Further, the non-magnetic steel sheet has a thickness less than or equal to 0.2 mm, so that each of the connecting portions of the magnet holder has a thickness less than or equal to 0.2 mm.

Each connected pair of one of the connecting portions and the end portion of one of the holding portions of the magnet holder has a boundary therebetween whose length in a longitudinal direction of the one of the holding portions is less than or equal to ⅓ of a length of the one of the holding portions.

Each of the holding portions of the magnet holder covers at least four faces of the corresponding permanent magnet.

Further, the four faces of the corresponding permanent magnet include a first side face that faces outward in a radial direction of the rotary shaft, a second side face that faces inward in the radial direction of the rotary shaft, and a third and a fourth side face which face opposite to each other in the circumferential direction of the rotary shaft.

Each of the holding portions includes a first side wall that completely covers the first side face of the corresponding permanent magnet.

Each of the holding portions partially covers the second, third, and fourth side faces of the corresponding permanent magnet.

More specifically, each of the holding portions includes a pair of second side walls that respectively cover two diagonally-opposite corner areas of the second side face of the corresponding permanent magnet, and a third and a fourth side wall that partially cover the third and fourth side faces of the corresponding permanent magnet, respectively. Each of the third and fourth side walls includes a first end section that is connected to an adjacent one of the second side walls, a second end section that is connected, as the end portion of the holding portion, to an adjacent one of the connecting portions, and an intermediate section between the first and second end sections. A length of the second side walls and the first end sections is greater than or equal to ½ of a difference between a length of the holding portion and a length of the second end sections of the third and fourth side walls in a longitudinal direction of the holding portion.

Each of the holding portions further includes a pair of end walls that respectively cover two opposite end faces of the corresponding permanent magnet.

The magnet holder further has a plurality of abutting portions, each of which extends radially outward from one of the connecting portions to abut the distal end portion of one of the claws of the first and second pole cores which is on the radially outer side of the one of the connecting portions.

Further, the abutting portions of the magnet holder are joined to the respectively abutting distal end portions of the claws of the first and second pole cores by one of welding and adhesion.

The magnet holder may be made by a method comprising the steps of: preparing a planar band that includes a plurality of first portions and a plurality of second portions, each of the first portions being shaped so as to form one of the holding portions of the magnet holder, each of the second portions being shaped so as to form one of the connecting portions of the magnet holder; bending the band to form a ring; and joining circumferential ends of the ring together, thereby forming the magnet holder.

The magnet holder further has formed therein a plurality of hooks each of which extends from one of the holding portions in the circumferential direction of the rotary shaft to abut a radially outer face of an adjacent one of the claws of the first and second pole cores.

According to a second aspect of the present invention, there is provided an automotive alternator which includes a rotor working to create a rotating magnetic field and a stator that surrounds the rotor and works to generate an AC power in the rotating magnetic field created by the rotor. Further, the rotor of the automotive alternator has such an improved configuration as described above according to the first aspect of the present invention.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

The preferred embodiments of the present invention will be described hereinafter with reference to FIGS. 1-13.

It should be noted that, for the sake of clarity and understanding, identical components having identical functions in different embodiments of the invention have been marked, where possible, with the same reference numerals in each of the figures.

First Embodiment

Figure 1:
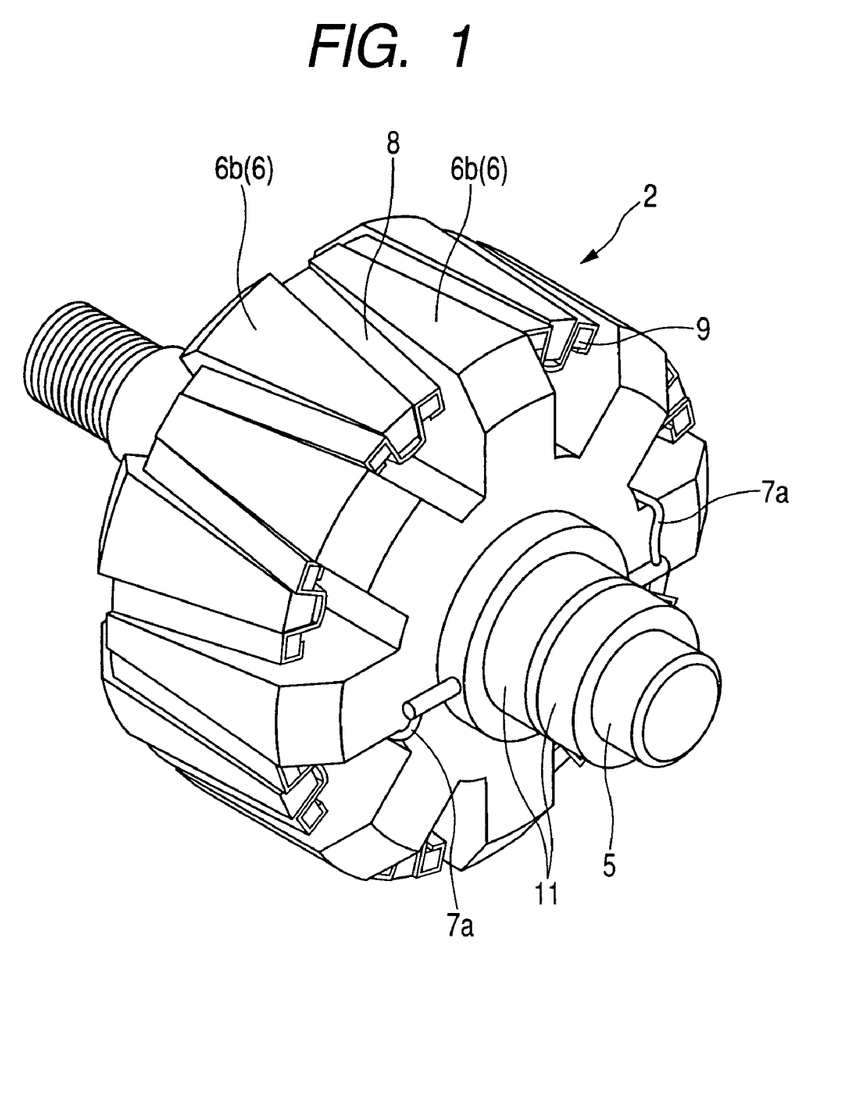
FIG. 1 is a perspective view showing the overall configuration of a rotor for an automotive alternator according to the first embodiment of the invention.
Figure 2:
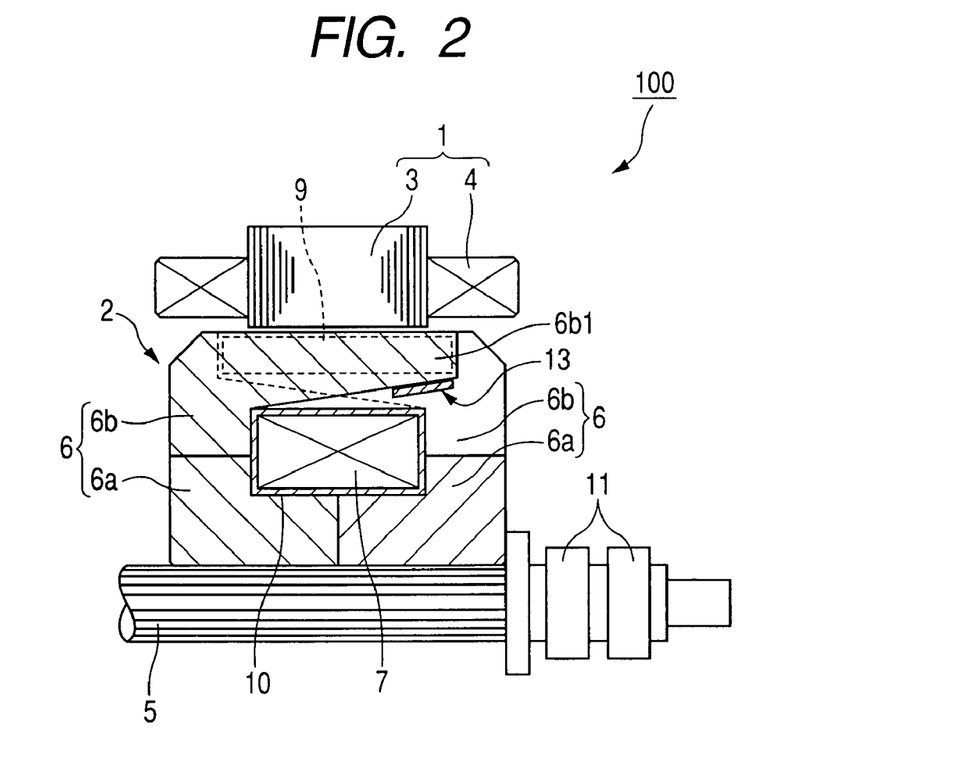
FIG. 2 is a partially cross-sectional side view showing part of the automotive alternator including the rotor.

FIG. 1 shows the overall configuration of a rotor 2 according to the first embodiment of the invention. FIG. 2 shows part of an alternator 100 for a vehicle which includes the rotor 2.

As shown in FIG. 2, the alternator 100 includes a stator 1, which works as an armature, and the rotor 2 that works as a field.

The stator 1 includes a stator core 3 and a stator coil 4. The stator core 3 has a hollow cylindrical shape so as to surround the rotor 2. The stator coil 4 is wound around the stator core 3, so that AC current is generated in the stator coil 4 when the rotor 2 rotates.

The rotor 2 includes a rotary shaft 5, a pair of lundell-type pole cores 6, a field coil 7, a magnet holder 8, a plurality of permanent magnets 9, and slip rings 11.

The rotary shaft 5 is configured to be driven by an engine of the vehicle. On a rear end portion of the rotary shaft 5, there is provided the slip rings 11 for supplying field current to the field coil 7 during rotation of the rotor 2.

The lundell-type pole cores 6 are fixed on the rotary shaft 5. Each of the pole cores 6 includes a boss portion 6a, which is serration-fitted on the rotary shaft 5, and a plurality of claw portions 6b each of which extends from the boss portion 6a first outward in the radial direction and then forward or backward in the axial direction of the rotary shaft 5. The pole cores 6 are so assembled that the claw portions 6b of one of the pole cores 6 are interleaved with those of the other pole core 6. In the present embodiment, each of the pole cores 6 includes 8 claw portions 6b.

Figure 3:
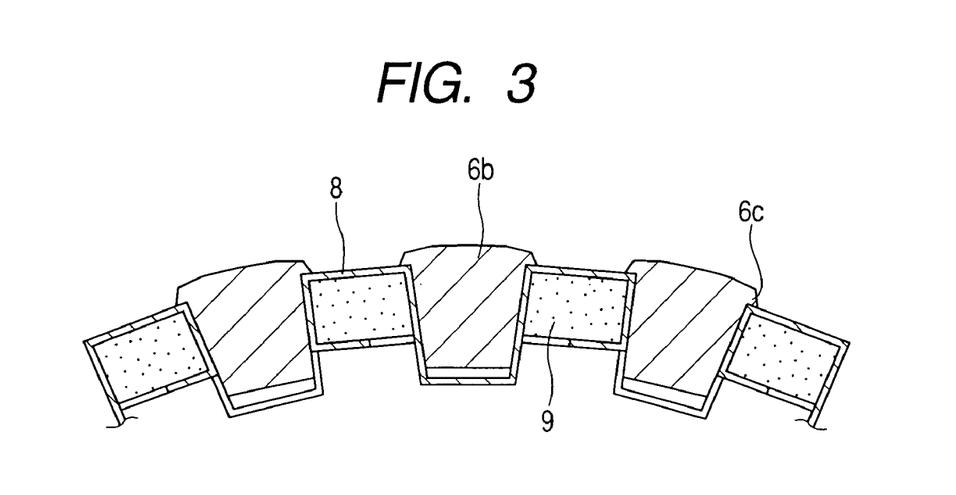
FIG. 3 is a cross-sectional view illustrating formation of ledges in claw portions of pole cores in the rotor.

Referring further to FIG. 3, each of the claw portions 6b has formed, on a radially outer area of each of the circumferential side faces thereof, a ledge 6c that extends in the axial direction of the rotary shaft 5. The ledges 6c are provided to keep the magnet holder 8 and the permanent magnets 9 from moving outward in the radial direction during rotation of the rotor 2.

The field coil 7 is, as shown in FIG. 2, wound in a winding space formed around the boss portions 6a of the pole cores 6 via a resin-made bobbin 10. Additionally, the field coil 7 is impregnated with an epoxy resin.

Further, as shown in FIG. 1, the field coil 7 is electrically connected to the slip rings 7 via leads 7a, so as to receive the field current from a battery (not shown) through sliding contacts between the slip rings 11 and brushes (not shown) arranged on the outer periphery of the slip rings 11. As well-known in the art, when the field current is supplied to the field coil 7, each of the claw portions 6b of one of the pole cores 6 becomes a south pole, while each of the claw portions 6b of the other pole core 6 becomes a north pole.

Figure 4:
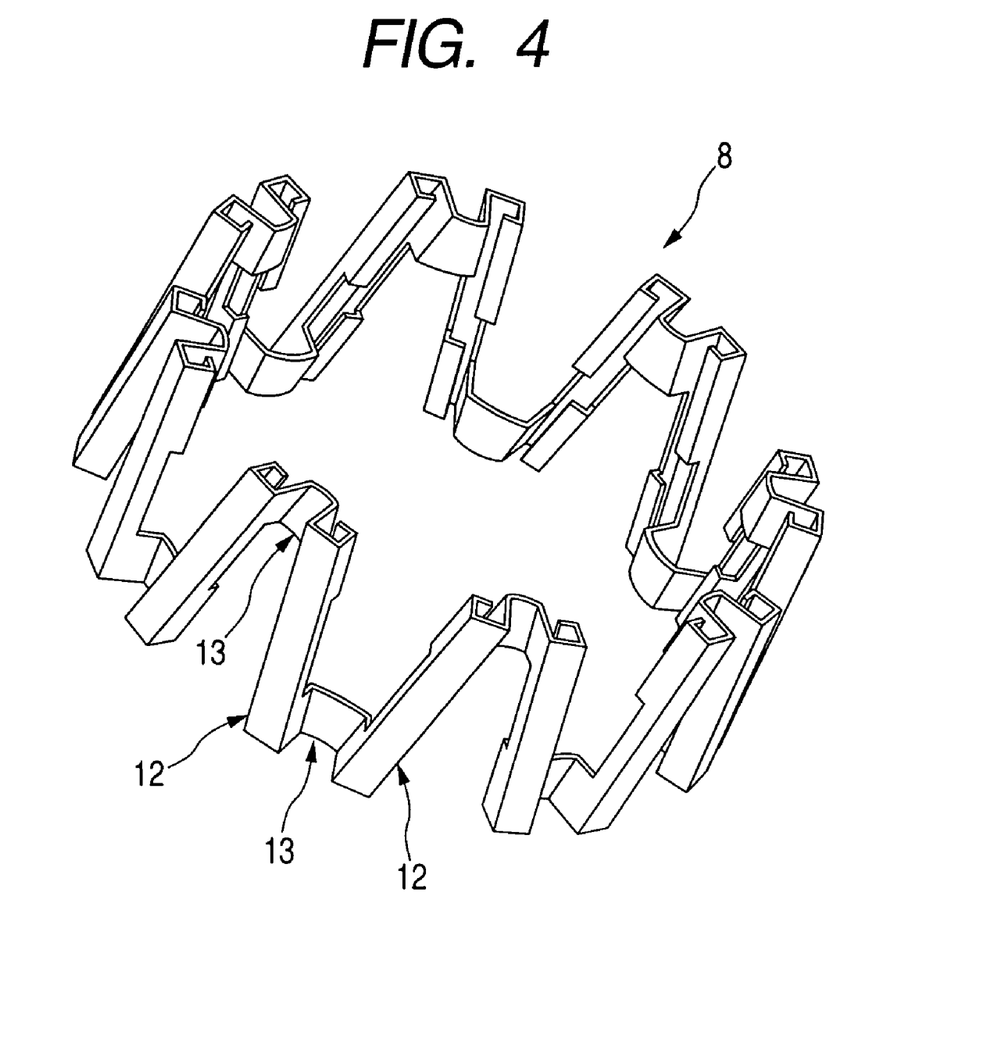
FIG. 4 is a perspective view of a magnet holder of the rotor.

Referring now to FIG. 4, the magnet holder 8 is shaped in a meandering ring that extends in the circumferential direction in a zigzag manner. In the present embodiment, the magnet holder 8 is made of a non-magnetic steel sheet having a thickness of, for example, 0.2 mm. More specifically, the magnet holder 8 is integrally formed by using the non-magnetic steel sheet through pressing, bending, and joining processes.

The magnet holder 8 includes a plurality of holding portions 12, each of which holds a corresponding one of the permanent magnets 9, and a plurality of connecting portions 13 each of which connects circumferentially adjacent two of the holing portions 12.

Figure 5:
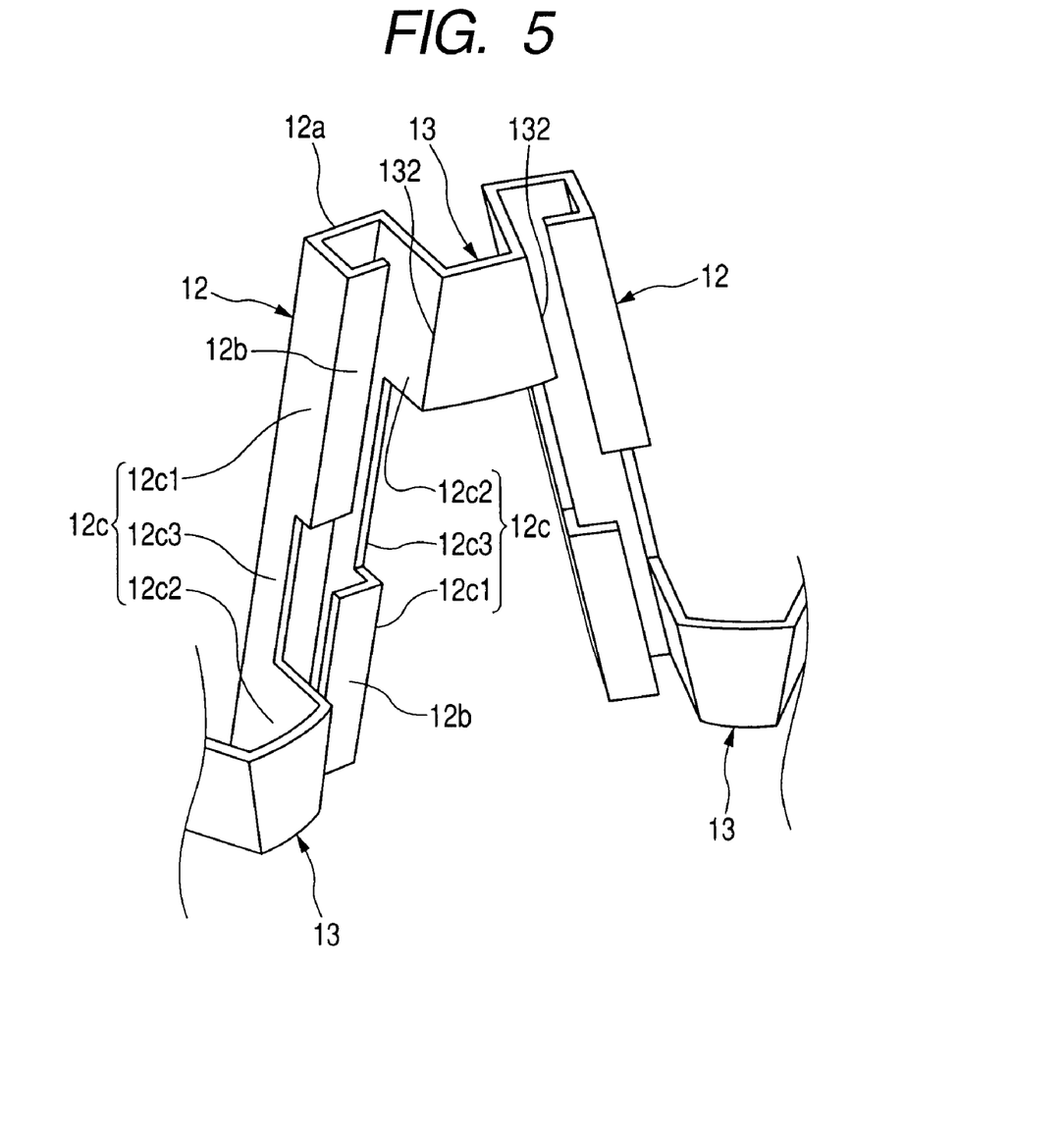
FIG. 5 is an enlarged perspective view showing part of the magnet holder.

Each of the holding portions 12 has, as shown in FIG. 5, a radially outer wall 12a, a pair of radially inner walls 12b, and a pair of circumferential side walls 12c.

The radially outer wall 12a has the shape of a rectangular plate conforming to the radially outer face of the corresponding permanent magnet 9, so as to fully cover the radially outer face.

The radially inner walls 12b also have the shape of a rectangular plate, but cover only two diagonally-opposite corner areas of the radially inner face of the corresponding permanent magnet 9, respectively.

The circumferential side walls 12c each has a first end section 12c1, a second end section 12c2, and an intermediate section 12c3.

The first end section 12c1 is connected and substantially perpendicular to an adjacent one of the radially inner walls 12b. The length of the first end section 12c1 in the longitudinal direction of the holding portion 12 is equal to that of the radially inner wall 12b connected thereto.

To secure sufficient rigidity of the magnet holder 8, the length of the first end section 12c1 (i.e., the length of the radially inner wall 12b) is preferably greater than or equal to ½ of the result of subtracting the length of the second end section 12c2 from the length of the holding portion 12 in the longitudinal direction. In the present embodiment, the length of the first end section 12c1 is set to ½ of the result.

The second end section 12c2 is connected, as an end portion of the holding portion 12, to an adjacent one of the connecting portions 13. The second end section 12c2 is substantially perpendicular to the connecting portion 13 connected thereto, and has the same length as that connecting portion 13 in the longitudinal direction of the holding portion 12.

The intermediate section 12c3 intervenes between the first and second end sections 12c1 and 12c2 in the longitudinal direction of the holding portion 12.

The intermediate section 12c3 has a width smaller than those of the first and second end sections 12c1 and 12c2 in the radial direction of the rotary shaft 5, so as to partially expose an adjacent one of the circumferential side faces of the corresponding permanent magnet 9. In other words, each of the side walls 12c of the holding portion 12 is shaped to partially cover the adjacent one of the circumferential side faces of the corresponding permanent magnet 9. It is preferable that the width of the intermediate second 12c3 is about ⅓ to ½ of the widths of the first and second end sections 12c1 and 12c2.

On the other hand, each of the connecting portions 13 extends in the circumferential direction of the rotary shaft 5, through the radially inner side of a distal end portion 6b1 of one of the claw portions 6b of the pole cores 6 (as shown in FIG. 2), to connect the second end sections 12c2 of adjacent two of the holding portions 12 which bracket the distal end portion 6b1.

Each of the connecting portions 13 is almost V-shaped conforming to the radially inner face of the distal end portion 6b1, and has boundaries 132 with the adjacent holding portions 12.

To secure sufficient flexibility of the magnet holder 8, the length of the boundaries 132, which is equal to the length of the second end sections 12c2 of the side walls 12c, is preferably equal to 1/10 to 1/3 of the length of the holding portion 12. In the present embodiment, the length of the boundaries 132 is set to 1/3 of the length of the holing portion 12.

Further, in the present embodiment, each of the connecting portions 13 is slightly bended radially inward between the adjacent holding portions 12, so as to enhance the flexibility of the magnet holder 8.

The permanent magnets 9 are held by the magnet holder 8, so that each of the permanent magnets 9 is interposed between adjacent two of the claw portions 6b of the pole cores 6 in the circumferential direction of the rotary shaft 5. Each of the permanent magnets 9 is so magnetized as to diminish the magnetic flux leakage between the two adjacent claw portions 6b. More specifically, each of the permanent magnets 9 is so polarized as to have, on each circumferential side face thereof, the same polarity as the claw portion 6b facing the each circumferential side face.

In addition, the permanent magnets 9 may be made up of, for example, ferrite magnets, resin magnets that are formed by sintering powder of nylon, Nd, Fe, and B, or rare earth magnets.

Figure 6:
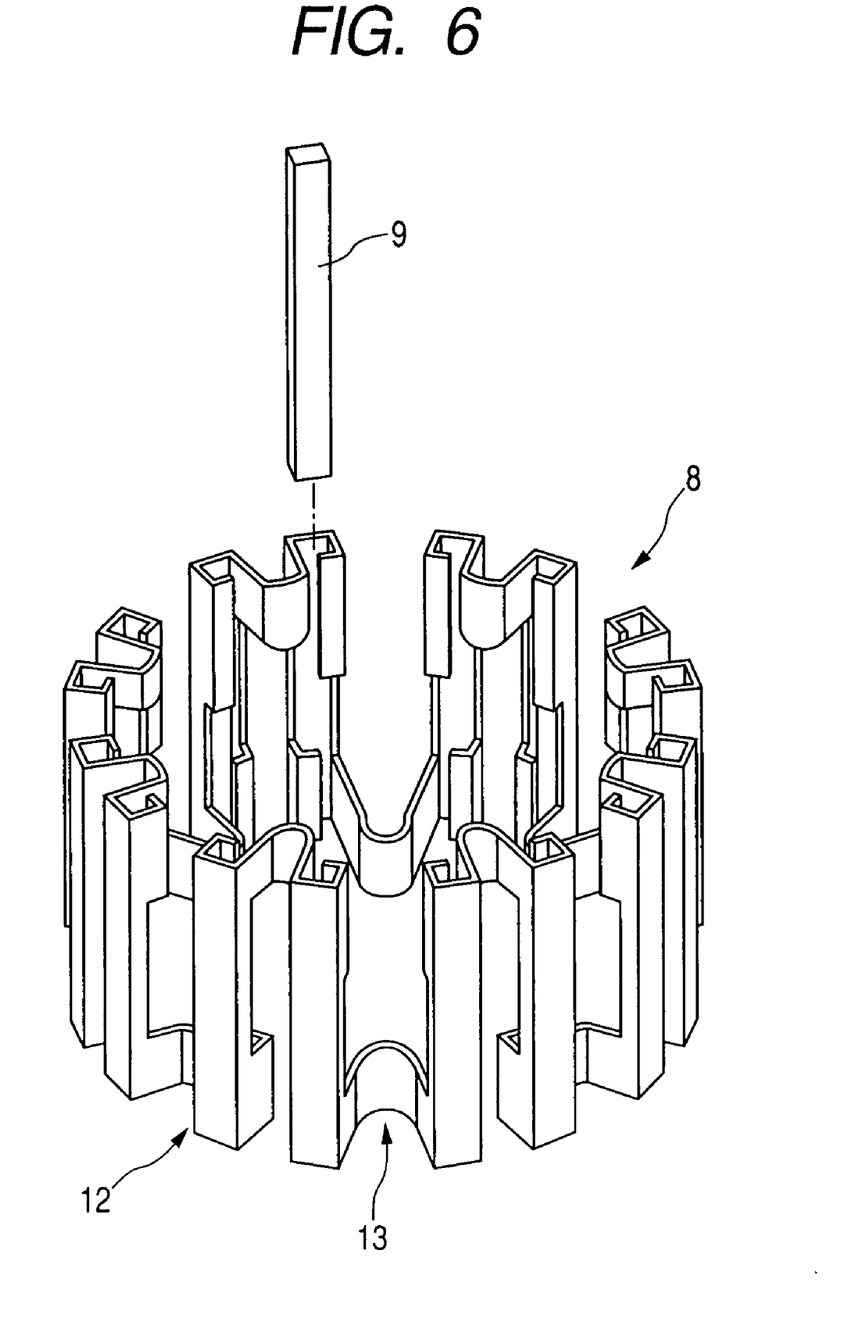
FIG. 6 is a perspective view showing the magnet holder in a state of being compressed radially inward.

In assembly of the permanent magnets 9 to the magnet holder 8, with reference to FIG. 6, the magnet holder 8 is first compressed radially inward, so that all the holding portions 12 become parallel to each other. Then, all of the permanent magnets 9 are concurrently inserted into the corresponding holding portions 12 of the magnet holder 8. It should be noted that for the sake of simplicity, only one of the permanent magnets 9 is depicted in FIG. 6.

Figure 7:
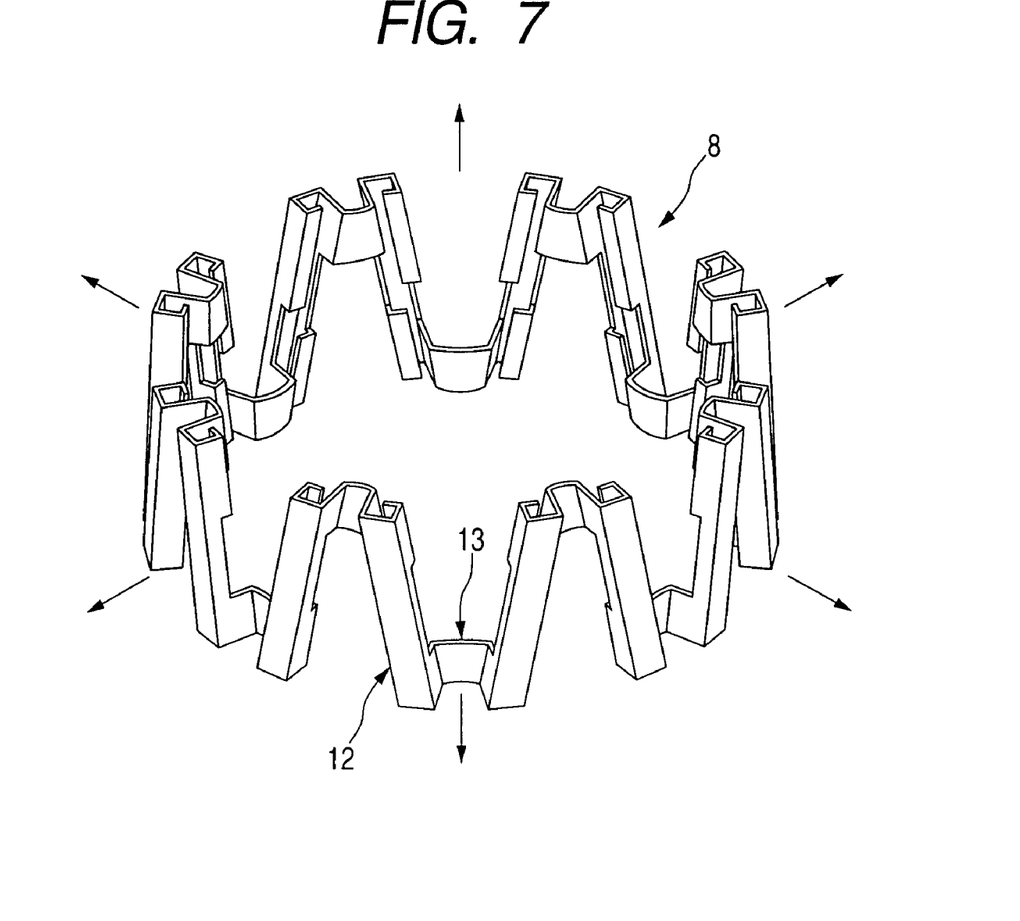
FIG. 7 is a perspective view showing the magnet holder in a state of being expanded radially outward.

After the assembly, the magnet holder 8 is expanded radially outward, so that every adjacent two of the holding portions 12 make up an almost V-shape, as shown in FIG. 7. Then, the magnet holder 8 is fitted, along with the permanent magnets 9, between the claw portions 6b of the pole cores 6.

The above-described rotor 2 according to the present embodiment has the following advantages.

In the rotor 2, the material used for the magnet holder 8 is a non-magnetic steel sheet. Therefore, the magnet holder 8 can be easily formed through pressing, bending, and joining processes.

Consequently, compared to the conventional magnet holder disclosed in U.S. Pat. No. 5,925,964, which is resin-molded using a complicated mold, the manufacturing cost can be considerably reduced.

Further, using the non-magnetic steel sheet, it is possible to make the magnet holder 8 as thin as 0.2 mm while securing sufficient strength of the magnet holder 8.

Moreover, in the rotor 2, each of the connecting portions 13 of the magnet holder 8 extends only through the radially inner side of the distal end portion 6b1 of the corresponding claw portion 6b to connect the end portions (i.e., the second end sections 12c2 of the side walls 12c) of the adjacent two holding portions 12 which bracket the distal end portion 6b1.

Consequently, compared to the conventional magnet holder, where each of the connecting portions connects the middle portions of the adjacent two holding portions, the space available for winding the field coil 7 around the pole cores 6 is increased.

As a result, it becomes possible to set both the wire turns and wire diameter of the field coil 7 to desirable values, thereby increasing the power output of the alternator 100.

In the magnet holder 8 of the rotor 2, each connected pair of one of the connecting portions 13 and one of the holding portions 12 has the boundary therebetween whose length is specified to be less than or equal to 1/3 of the length of the one of the holding portions 12.

Specifying the boundary length as above, it is possible to secure sufficient flexibility of the magnet holder 8. Thus, in assembly of the permanent magnets 9 to the magnet holder 8, it is possible to compress the entire magnet holder 8 radially inward to make the holding portions 12 parallel to each other, as described above. As a result, all of the permanent magnets 9 can be concurrently inserted into the corresponding holding portions 12, thus reducing the steps of assembly and the manufacturing cost of the rotor 2.

Further, after the assembly, it is possible to expand the entire magnet holder 8 radially outward to make the holding portions 12 in V-shapes, thereby making the magnet holder easy to be fitted between the claw portions 6b of the pole cores 6.

In the rotor 2, each of the holding portions 12 of the magnet holder 8 covers four faces of the corresponding permanent magnet 9. More specifically, each of the holding portions 12 has the radially outer wall 12a, the radially inner walls 12b, and the circumferential side walls 12c, which respectively cover the radially outer face, the radially inner face, and the circumferential side faces of the corresponding permanent magnet 9.

Consequently, with the above configuration, it is possible for the magnet holder 8 to stably hold the permanent magnets 9.

Further, the radially outer wall 12a of each of the holding portions 12 completely covers the radially outer face of the corresponding permanent magnet 9.

Accordingly, it is possible to prevent foreign matters from directly striking the radially outer face of the corresponding permanent magnet 9 to damage it. In addition, in case that the corresponding permanent magnet 9 is accidentally broken or chipped, it is possible to keep the broken or chipped pieces from flying radially outward to damage the stator coil 4.

On the other hand, the radially inner walls 12b and the circumferential side walls 12c only partially cover the radially inner face and the circumferential side faces of the corresponding permanent magnet 9, respectively.

Thus, in fitting by adhesion an assembly of the magnet holder 8 and the permanent magnets 9 between the claw portions 6b of the pole cores 6, the adhesive can flow, through the uncovered areas on the radially inner and circumferential side faces of the permanent magnets 9, into the clearances between the claw portions 6b and the holding portions 12 and between the permanent magnets 9 and the holding portions 12 by capillary phenomenon.

Furthermore, in the magnet holder 8, the length of the first end sections 12c1 of the circumferential side walls 12c (i.e., the length of the radially inner walls 12b) of the holding portions 12 is specified to be greater than or equal to 1/2 of the difference between the length of the holding portions 12 and the length of the second end sections 12c2 of the circumferential side walls 12c.

Specifying the length of the first end sections 12c1 as above, it is possible to secure sufficient rigidity of the magnet holder 8. Consequently, during insertion of the permanent magnets 9 into the corresponding holding portions 12 of the magnet holder 8, it is possible to prevent deformation of the holding portions 12, thereby facilitating the insertion.

Second Embodiment

Figure 8:
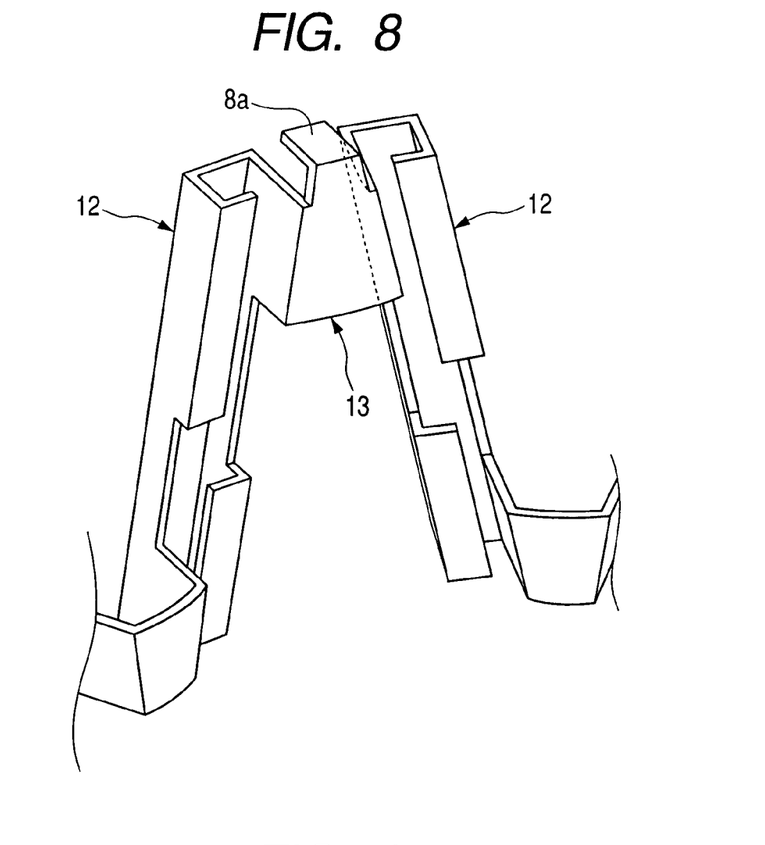
FIG. 8 is a perspective view showing a magnet holder according to the second embodiment of the invention.

FIG. 8 shows part of a magnet holder 8 according to the second embodiment of the invention, which includes, in addition to the holding portions 12 and the connecting portions 13, a plurality of abutting portions 8a.

Figure 9:
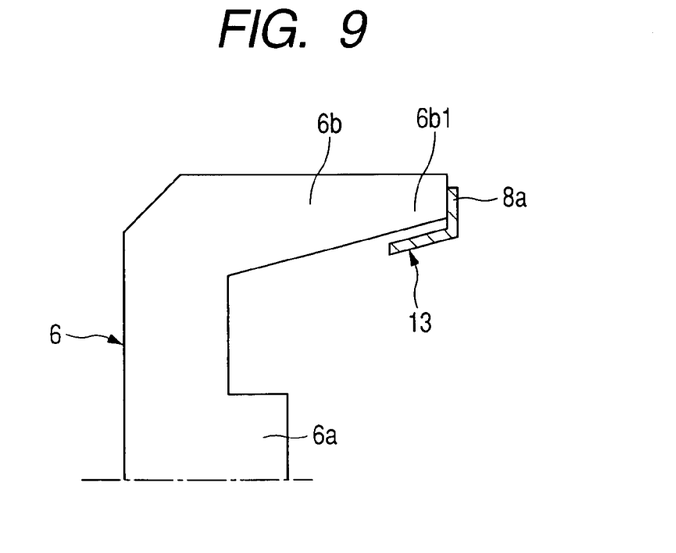
FIG. 9 is a partially cross-sectional side view illustrating an abutting portion of the magnet holder of FIG. 8.

Referring further to FIG. 9, each of the abutting portions 8a extends radially outward from one of the connecting portions 13 to abut the distal end portion 6b1 of one of the claw portions 6b of the pole cores 6 which is on the radially outer side of the one of the connecting portions 13.

The abutting portions 8a work to inhibit relative axial movement between the magnet holder 8 and the pole cores 6. Thus, with the abutting portions 8a, it is possible to accurately position the magnet holder 8 in the axial direction of the rotary shaft 5.

Consequently, the permanent magnets 9 held by the magnet holder 8 can also be accurately positioned in the axial direction, thereby reliably diminishing the magnetic flux leakage between the claw portions 6b of the pole cores 6.

In addition, to achieve a further accurate positioning, it is possible to join the abutting portions 8a to the respectively abutting distal end portions 6b1 of the claw portions 6b by, for example, welding or adhesion.

Third Embodiment

Figure 10:
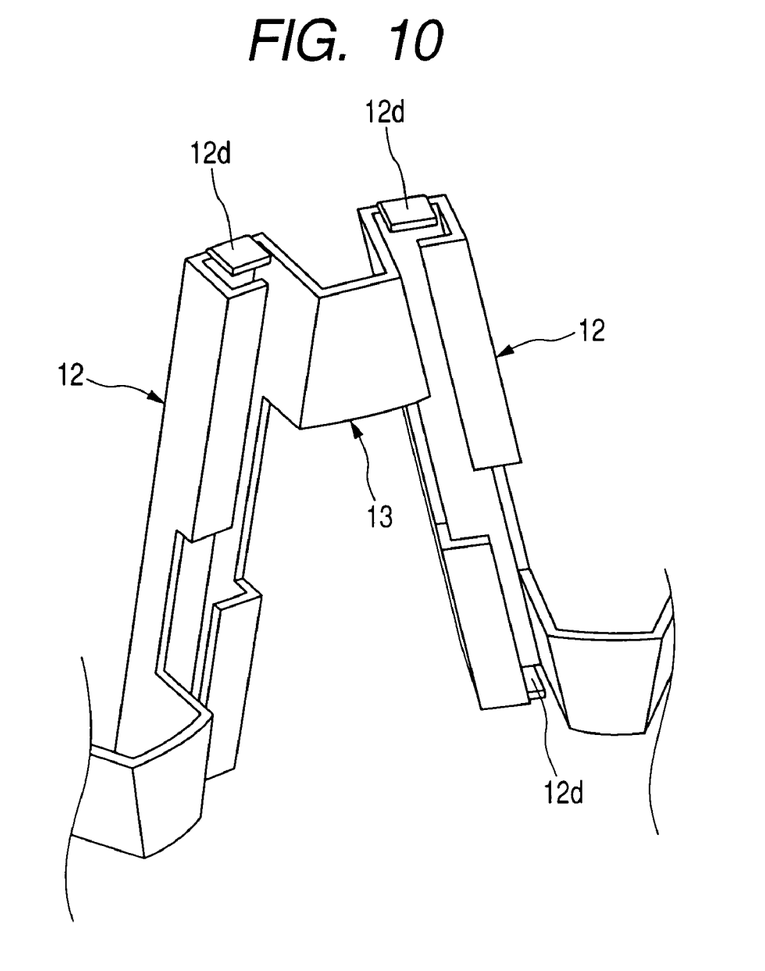
FIG. 10 is a perspective view showing part of a magnet holder according to the third embodiment of the invention.

FIG. 10 shows part of a magnet holder 8 according to the third embodiment of the invention.

As shown in FIG. 10, in this embodiment, each of the holding portions 12 further includes a pair of end walls 12d, each of which extends radially inward from one of the longitudinal ends of the radially outer wall 12a of the holding portion 12.

With the end walls 12d, it is possible to impede movement of the one of the permanent magnets 9 held in the holding portion 12 in the longitudinal direction of the holding portion 12. Consequently, it is possible to accurately position the one of the permanent magnets 9 in the axial direction of the rotary shaft 5.

Fourth Embodiment

Figure 11A:
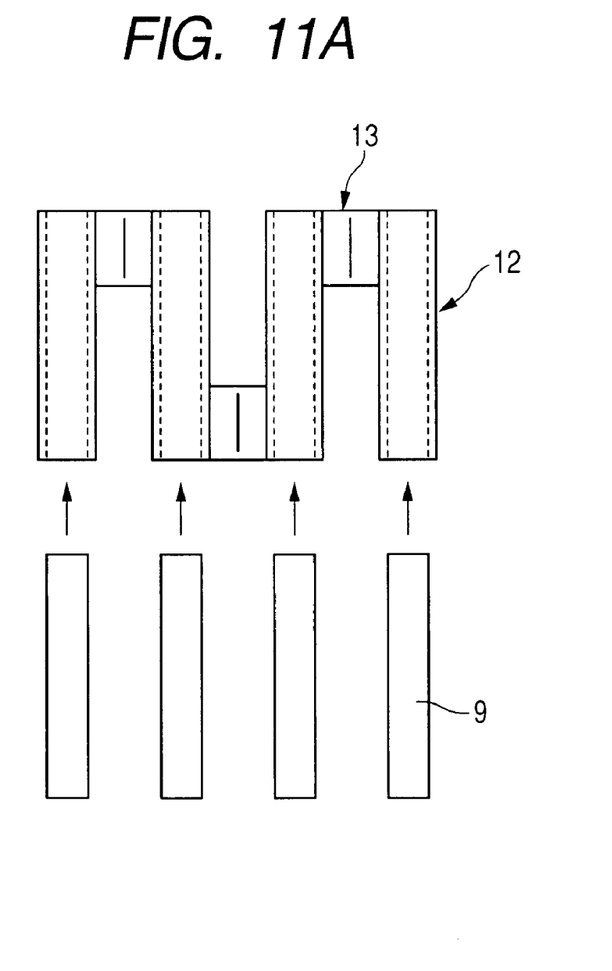
FIGS. 11A-11B are views illustrating a method of assembling permanent magnets to a magnet holder according to the fourth embodiment of the invention.
Figure 11B:
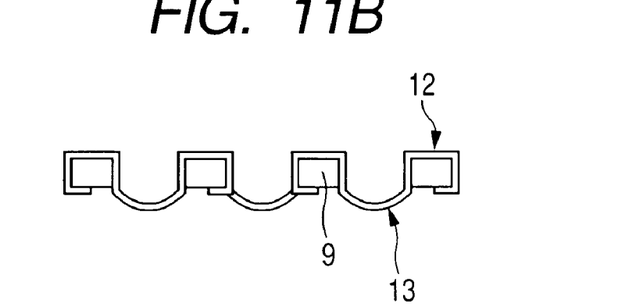

This embodiment illustrates a method of assembling the permanent magnets 9 to the magnet holder 8, which is different from the assembly method described in the first embodiment.

Referring to FIG. 11A, in this embodiment, the magnet holder 8 is first provided in the form of a planar band which includes a plurality of first portions 12, each of which is shaped to make up one of the holding portions 12, and a plurality of second portions 13 each of which is shaped to make up one of the connecting portions 13.

Then, all of the permanent magnets 9 are concurrently inserted into the corresponding first portions 12 of the band which are in parallel with each other.

After the insertion, the band, which holds the permanent magnets 9 as shown in FIG. 11B, is bent to form a ring.

Thereafter, the circumferential ends of the ring are joined together by, for example, welding or crimping.

As a result, the magnet holder 8 having the permanent magnets 9 assembled thereto is obtained.

Fifth Embodiment

Figure 12:
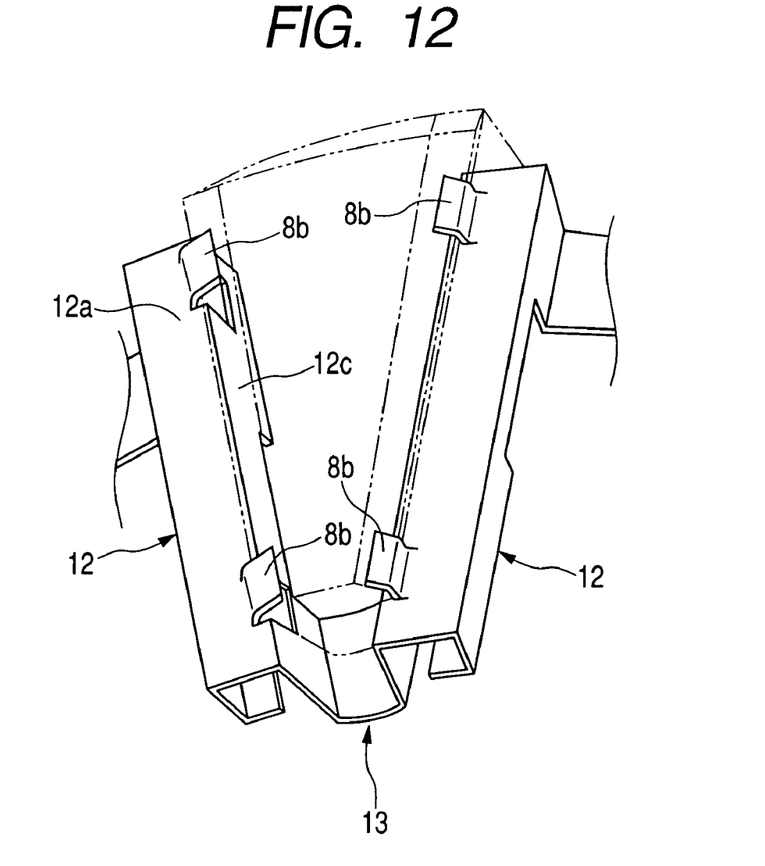
FIG. 12 is a perspective view showing part of a magnet holder according to the fifth embodiment of the invention.

FIG. 12 shows part of a magnet holder 8 according to the fifth embodiment of the invention, which includes a plurality of hooks 8b.

Each of the hooks 8b is formed by cutting and protruding a rectangular part from one of the holding portions 12 and then bending the part into the hook shape. Each of the hooks 8b is located close to one longitudinal end of the holding portion 12.

Figure 13:
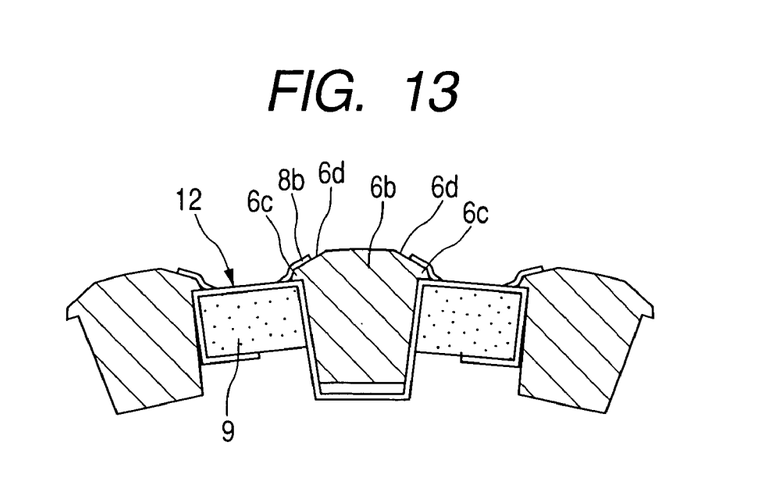
FIG. 13 is a cross-sectional view illustrating formation of hooks in the magnet holder of FIG. 12.

Referring further to FIG. 13, in this embodiment, each of the claw portions 6b of the pole cores 6 has a chamfer 6d formed at each radially outer corner thereof.

After fitting the magnet holder 8 along with the permanent magnets 9 between the claw portions 6b of the pole cores 6, each of the hooks 8b of the magnet holder 8 abuts one of the chamfers 6d of the claw portions 6b. Thus, the hooks 8b and the respective holding portions 12 together pinch the ledges 6c of the claw portions 6b of the pole cores 6.

With the above configuration, it is possible to impede relative movement between the magnet holder 8 and the claw portions 6b of the pole cores 6, thereby allowing the permanent magnets 9 to be accurately positioned.

While the above particular embodiments of the invention have been shown and described, it will be understood by those who practice the invention and those skilled in the art that various modifications, changes, and improvements may be made to the invention without departing from the spirit of the disclosed concept.

For example, though the rotor 2 is employed in the automotive alternator 100 in the previous embodiments, it may also be applied to other rotating electrical machines, such as an AC motor.

Such modifications, changes, and improvements within the skill of the art are intended to be covered by the appended claims.

What is claimed is:

1. A rotor for a rotating electrical machine comprising:
   a rotary shaft;
   a pair of first and second pole cores fixed on the rotary shaft, each of the first and second pole cores including a plurality of claws each of which extends in an axial direction of the rotary shaft and has a distal end portion, the claws of the first pole core being interleaved with the claws of the second pole core;
   a plurality of permanent magnets each of which is interposed between adjacent two of the claws of the first and second pole cores in a circumferential direction of the rotary shaft; and
   a magnet holder holding the permanent magnets, the magnet holder being made of a non-magnetic metal and having a plurality of holding portions and a plurality of connecting portions, each of the holding portions being interposed between adjacent two of the claws of the first and second pole cores in the circumferential direction of the rotary shaft, so as to hold a corresponding one of the permanent magnets between the adjacent two of the claws, each of the connecting portions extending in the circumferential direction of the rotary shaft, through the radially inner side of the distal end portion of one of the claws of the first and second pole cores, to connect end portions of adjacent two of the holding portions which bracket the distal end portion in the circumferential direction, wherein
   each connected pair of one of the connecting portions and the end portion of one of the holding portions of the magnet holder has a boundary therebetween whose length in a longitudinal direction of the one of the holding portions is less than or equal to ⅓ of a length of the one of the holding portions.

2. The rotor as set forth in claim 1, wherein the magnet holder is made of a non-magnetic steel sheet.

3. The rotor as set forth in claim 2, wherein the non-magnetic steel sheet has a thickness less than or equal to 0.2 mm, so that each of the connecting portions of the magnet holder has a thickness less than or equal to 0.2 mm.

4. The rotor as set forth in claim 1, the magnet holder comprising:
   a band that is bent into a ring and has circumferential ends of the ring joined together, wherein
   the band includes a plurality of first portions, shaped to form one of the holding portions of the magnetic holder, and a plurality of second portions shaped to form one of the connecting portions of the magnetic holder.

5. The rotor as set forth in claim 1, wherein the rotating electrical machine is an automotive alternator.

6. A rotor for a rotating electrical machine comprising:
   a rotary shaft;
   a pair of first and second pole cores fixed on the rotary shaft, each of the first and second pole cores including a plurality of claws each of which extends in an axial direction of the rotary shaft and has a distal end portion, the claws of the first pole core being interleaved with the claws of the second pole core;
   a plurality of permanent magnets each of which is interposed between adjacent two of the claws of the first and second pole cores in a circumferential direction of the rotary shaft; and
   a magnet holder holding the permanent magnets, the magnet holder being made of a non-magnetic metal and having a plurality of holding portions and a plurality of connecting portions, each of the holding portions being interposed between adjacent two of the claws of the first and second pole cores in the circumferential direction of the rotary shaft, so as to hold a corresponding one of the permanent magnets between the adjacent two of the claws, each of the connecting portions extending in the circumferential direction of the rotary shaft, through the radially inner side of the distal end portion of one of the claws of the first and second pole cores, to connect end portions of adjacent two of the holding portions which bracket the distal end portion in the circumferential direction, wherein
   each of the holding portions of the magnet holder covers at least four faces of the corresponding permanent magnet.

7. The rotor as set forth in claim 6, wherein the four faces of the corresponding permanent magnet include a first side face that faces outward in a radial direction of the rotary shaft, a second side face that faces inward in the radial direction of the rotary shaft, and a third and a fourth side face which face opposite to each other in the circumferential direction of the rotary shaft.

8. The rotor as set forth in claim 7, wherein each of the holding portions includes a first side wall that completely covers the first side face of the corresponding permanent magnet.

9. The rotor as set forth in claim 8, wherein each of the holding portions partially covers the second, third, and fourth side faces of the corresponding permanent magnet.

10. The rotor as set forth in claim 9, wherein each of the holding portions includes a pair of second side walls that respectively cover two diagonally-opposite corner areas of the second side face of the corresponding permanent magnet, and a third and a fourth side wall that partially cover the third and fourth side faces of the corresponding permanent magnet, respectively,
    each of the third and fourth side walls includes a first end section that is connected to an adjacent one of the second side walls, a second end section that is connected, as the end portion of the holding portion, to an adjacent one of the connecting portions, and an intermediate section between the first and second end sections, and
    a length of the second side walls and the first end sections of the third and fourth side walls is greater than or equal to ½ of a difference between a length of the holding portion and a length of the second end sections of the third and fourth side walls in a longitudinal direction of the holding portion.

11. The rotor as set forth in claim 10, wherein each of the holding portions further includes a pair of end walls that respectively cover two opposite end faces of the corresponding permanent magnet.

12. The rotor as set forth in claim 6, wherein the magnet holder is made of a non-magnetic steel sheet.

13. The rotor as set forth in claim 12, wherein the non-magnetic steel sheet has a thickness less than or equal to 0.2 mm, so that each of the connecting portions of the magnet holder has a thickness less than or equal to 0.2 mm.

14. The rotor as set forth in claim 6, the magnet holder comprising:
    a band that is bent into a ring and has circumferential ends of the ring joined together, wherein
    the band includes a plurality of first portions, shaped to form one of the holding portions of the magnetic holder, and a plurality of second portions shaped to form one of the connecting portions of the magnetic holder.

15. The rotor as set forth in claim 6, wherein the rotating electrical machine is an automotive alternator.

16. A rotor for a rotating electrical machine comprising:
    a rotary shaft;
    a pair of first and second pole cores fixed on the rotary shaft, each of the first and second pole cores including a plurality of claws each of which extends in an axial direction of the rotary shaft and has a distal end portion, the claws of the first pole core being interleaved with the claws of the second pole core;
    a plurality of permanent magnets each of which is interposed between adjacent two of the claws of the first and second pole cores in a circumferential direction of the rotary shaft; and
    a magnet holder holding the permanent magnets, the magnet holder being made of a non-magnetic metal and having a plurality of holding portions and a plurality of connecting portions, each of the holding portions being interposed between adjacent two of the claws of the first and second pole cores in the circumferential direction of the rotary shaft, so as to hold a corresponding one of the permanent magnets between the adjacent two of the claws, each of the connecting portions extending in the circumferential direction of the rotary shaft, through the radially inner side of the distal end portion of one of the claws of the first and second pole cores, to connect end portions of adjacent two of the holding portions which bracket the distal end portion in the circumferential direction, wherein
    the magnet holder further has a plurality of abutting portions, each of which extends radially outward from one of the connecting portions to abut the distal end portion of one of the claws of the first and second pole cores which is on the radially outer side of the one of the connecting portions.

17. The rotor as set forth in claim 16, wherein the abutting portions of the magnet holder are joined to the respectively abutting distal end portions of the claws of the first and second pole cores by one of welding and adhesion.

18. The rotor as set forth in claim 16, wherein the magnet holder is made of a non-magnetic steel sheet.

19. The rotor as set forth in claim 18, wherein the non-magnetic steel sheet has a thickness less than or equal to 0.2 mm, so that each of the connecting portions of the magnet holder has a thickness less than or equal to 0.2 mm.

20. The rotor as set forth in claim 16, the magnet holder comprising:
a band that is bent into a ring and has circumferential ends of the ring joined together, wherein
the band includes a plurality of first portions, shaped to form one of the holding portions of the magnetic holder, and a plurality of second portions shaped to form one of the connecting portions of the magnetic holder.

21. The rotor as set forth in claim 16, wherein the rotating electrical machine is an automotive alternator.

22. A rotor for a rotating electrical machine comprising:
a rotary shaft;
a pair of first and second pole cores fixed on the rotary shaft, each of the first and second pole cores including a plurality of claws each of which extends in an axial direction of the rotary shaft and has a distal end portion, the claws of the first pole core being interleaved with the claws of the second pole core;
a plurality of permanent magnets each of which is interposed between adjacent two of the claws of the first and second pole cores in a circumferential direction of the rotary shaft; and
a magnet holder holding the permanent magnets, the magnet holder being made of a non-magnetic metal and having a plurality of holding portions and a plurality of connecting portions, each of the holding portions being interposed between adjacent two of the claws of the first and second pole cores in the circumferential direction of the rotary shaft, so as to hold a corresponding one of the permanent magnets between the adjacent two of the claws, each of the connecting portions extending in the circumferential direction of the rotary shaft, through the radially inner side of the distal end portion of one of the claws of the first and second pole cores, to connect end portions of adjacent two of the holding portions which bracket the distal end portion in the circumferential direction, wherein
the magnet holder further has formed therein a plurality of hooks each of which extends from one of the holding portions in the circumferential direction of the rotary shaft to abut a radially outer face of an adjacent one of the claws of the first and second pole cores.

23. The rotor as set forth in claim 22, wherein the magnet holder is made of a non-magnetic steel sheet.

24. The rotor as set forth in claim 23, wherein the non-magnetic steel sheet has a thickness less than or equal to 0.2 mm, so that each of the connecting portions of the magnet holder has a thickness less than or equal to 0.2 mm.

25. The rotor as set forth in claim 22, the magnet holder comprising:
a band that is bent into a ring and has circumferential ends of the ring joined together, wherein
the band includes a plurality of first portions, shaped to form one of the holding portions of the magnetic holder, and a plurality of second portions shaped to form one of the connecting portions of the magnetic holder.

26. The rotor as set forth in claim 22, wherein the rotating electrical machine is an automotive alternator.

27. An automotive alternator comprising:
a rotor working to create a rotating magnetic field; and
a stator surrounding the rotor and working to generate an AC power in the rotating magnetic field created by the rotor,
wherein the rotor includes:
a rotary shaft;
a pair of first and second pole cores fixed on the rotary shaft, each of the first and second pole cores including a plurality of claws each of which extends in an axial direction of the rotary shaft and has a distal end portion, the claws of the first pole core being interleaved with the claws of the second pole core;
a plurality of permanent magnets each of which is interposed between adjacent two of the claws of the first and second role cores in a circumferential direction of the rotary shaft and
a magnet holder holding the permanent magnets, the magnet holder being made of a non-magnetic metal and having a plurality of holding portions and a plurality of connecting portions, each of the holding portions being interposed between adjacent two of the claws of the first and second pole cores in the circumferential direction of the rotary shaft, so as to hold a corresponding one of the permanent magnets between the adjacent two of the claws, each of the connecting portions extending in the circumferential direction of the rotary shaft, through the radially inner side of the distal end portion of one of the claws of the first and second pole cores, to connect end portions of adjacent two of the holding portions which bracket the distal end portion in the circumferential direction, wherein
each connected pair of one of the connecting portions and the end portion of one of the holding portions of the magnet holder has a boundary therebetween whose length in a longitudinal direction of the one of the holding portions is less than or equal to $\frac{1}{3}$ of a length of the one of the holding portions.

28. The alternator as set forth in claim 27, wherein the magnet holder of the rotor is made of a non-magnetic steel sheet.

29. The alternator as set forth in claim 28, wherein the non-magnetic steel sheet has a thickness less than or equal to 0.2 mm, so that each of the connecting portions of the magnet holder has a thickness less than or equal to 0.2 mm.

* * * * *